United States Patent
Heuer

(10) Patent No.: US 11,173,802 B2
(45) Date of Patent: Nov. 16, 2021

(54) METHOD FOR CONTROLLING A CHARGING PROCESS OF A VEHICLE AT A CHARGING POST USING FIRST AND SECOND AUTHORISATION VERIFICATION

(71) Applicant: EcoG GmbH, Oberhaching (DE)

(72) Inventor: Jörg Heuer, Oberhaching (DE)

(73) Assignee: EcoG GmbH, Oberhaching (DE)

(*) Notice: Subject to any disclaimer, the term of this patent is extended or adjusted under 35 U.S.C. 154(b) by 159 days.

(21) Appl. No.: 16/604,846

(22) PCT Filed: Jan. 9, 2018

(86) PCT No.: PCT/EP2018/050392
§ 371 (c)(1),
(2) Date: Oct. 11, 2019

(87) PCT Pub. No.: WO2018/188818
PCT Pub. Date: Oct. 18, 2018

(65) Prior Publication Data
US 2020/0164759 A1 May 28, 2020

(30) Foreign Application Priority Data

Apr. 13, 2017 (DE) ............ 10 2017 206 369.6

(51) Int. Cl.
*B60L 53/64* (2019.01)
*H02J 7/00* (2006.01)
(Continued)

(52) U.S. Cl.
CPC .......... *B60L 53/68* (2019.02); *H02J 7/00045* (2020.01); *H04B 5/0081* (2013.01); *H04W 12/47* (2021.01)

(58) Field of Classification Search
CPC ............ B60L 53/68; H04W 12/00407; H04B 5/0081; H02J 7/00045
(Continued)

(56) References Cited

U.S. PATENT DOCUMENTS 8,487,584 B2 * 7/2013 Taylor-Haw et al. ................ G07F 15/005 320/109
9,348,381 B2 * 5/2016 Khoo et al. ........ G06F 1/26
(Continued)

FOREIGN PATENT DOCUMENTS

DE 102012221288 A1 5/2014
DE 102017206106 A1 10/2018
(Continued)

OTHER PUBLICATIONS

International Search Report in PCT/EP2018/050392, dated May 4, 2018.

*Primary Examiner* — Sun J Lin
(74) *Attorney, Agent, or Firm* — Seyfarth Shaw LLP

(57) ABSTRACT

A method for controlling a charging operation of a vehicle at a charging station includes monitoring, modifying, stopping, or terminating the charging operation, independent of an identification device initially used for approval of a charging. The charging is controlled via a control link established via a near-field communication link between a mobile terminal device and a control device of the charging station. The near-field communication link enables a receipt of a termination instruction by the control device for terminating the charging operation.

20 Claims, 2 Drawing Sheets

(51) Int. Cl.
  *H04B 5/00* (2006.01)
  *H04W 12/00* (2021.01)
  *B60L 53/68* (2019.01)
  *H04W 12/47* (2021.01)

(58) Field of Classification Search
  USPC ......................................................... 320/109
  See application file for complete search history.

(56) References Cited

U.S. PATENT DOCUMENTS

| | | | |
|---|---|---|---|
| 10,336,206 B2* | 7/2019 | Uyeki et al. | B60L 53/305 |
| 10,717,409 B2* | 7/2020 | Bode | B60L 53/65 |
| 10,949,843 B2* | 3/2021 | Mouftah et al. | G06Q 20/18 |
| 2010/0274570 A1* | 10/2010 | Proefke et al. | B60L 53/67 |
| | | | 705/1.1 |
| 2011/0270480 A1 | 11/2011 | Ishibashi et al. | |

FOREIGN PATENT DOCUMENTS

| | | |
|---|---|---|
| EP | 2674727 A1 | 12/2013 |
| WO | 2013010592 A1 | 1/2013 |
| WO | 2014061249 A1 | 4/2014 |
| WO | 2015043247 A1 | 4/2015 |

* cited by examiner

METHOD FOR CONTROLLING A CHARGING PROCESS OF A VEHICLE AT A CHARGING POST USING FIRST AND SECOND AUTHORISATION VERIFICATION

The invention relates to a method for controlling a charging operation of a vehicle at a charging station.

Charging stations for electrically charging electric vehicles or at least partially electrically powered vehicles are well known. For charging, the electric vehicle is parked at a charging station in order to charge its accumulators via an electric cable or by induction coils. Public charging stations which provide charging for a fee, are known. Several methods of identification and authorization of a charging station user at a charging station are known for billing the withdrawn electric energy or for other charging services.

For example, the use of cards or credit cards for the wireless identification or authorization of a charging station user is well-known. The cardholder's identity or authorization is verified in the charging station—possibly with the participation of an authorization server that is remote from the charging station—by means of the transferred identification data of the card, before the charging station approves charging.

Common cards include contactless RFID cards (Radio Frequency Identification), which are issued by Mobility Operators, for example. A charging station user puts such card into the effective range of an RFID transponder attached to the charging station, whereupon the charging operation is started after the charging cable has been connected, when the charging station user has been authorized accordingly.

Mobile terminal devices such as smartphones, with a corresponding application executed thereon, are also suitable for the identification and authorization of a charging station user as well as for electronic payment at charging stations. After confirmation of the identity—which is optionally accompanied by additional authentication features such as PIN entry, fingerprint verification, etc. —an authorization is carried out, i.e. a determination as to whether the identified charging station user is authorized for use.

Typically, methods for authorizing a charging station user with a mobile terminal device envisage that a communication link is established with the mobile terminal device to a remote authorization server on which registered charging station users are administered and which controls an allocation of charging stations to respective charging station users. Via the communication link, the authorization server is informed about an identity of the charging station user and an identity of a chosen charging station. After authenticating and verifying an authorization of the charging station user, the authorization server transmits an approval of charging to the chosen charging station, whereupon the charging station user can initiate the start of the charging operation, for example by connecting the charging cable to the vehicle.

When the charging cable has been connected between the vehicle and the charging station, the charging operation is started based on the approval of charging. During the charging operation, the plug is at least locked to the vehicle so that it cannot be disconnected or removed while charging is in progress.

To protect against unauthorized operation of the charging station by third parties, after the charging operation has been started, a new verification of the identity and/or authorization by the identification means selected for the approval of charging—card and/or mobile terminal device—is required in order to control the charging operation.

In this description, controlling the charging operation means monitoring the charging operation, modifying the charging operation and/or stopping or terminating the charging operation. A modification of the charging operation includes, for example, a transition to a higher charging power after the charging operation has started.

The use of the identification means, which are also used for the approval of charging, to terminate the charging operation, which is required in the state of the art, has more serious disadvantages.

Charging stations can be provided at a variety of possible locations, such as parking lots at motorway service areas, on the roadside, or in parking garages. In particular charging points installed along long-distance routes are often located in an area that is insufficiently supplied by a mobile phone network, so that establishing a communication link between the mobile terminal device and the authorization server for the purpose of identification or authorization can be disturbed or impossible. Temporary disturbances or impairments of the mobile phone network are also known, which temporarily impair a communication link or make it impossible.

In this case, a charging station user who wants to terminate or otherwise control a running charging operation due to an incident that occurred during the charging operation could not connect to the authorization server to stop the charging operation. Such an incident could be, for example, an emergency or a rapidly noticed appointment, which requires a rapid interruption of the charging operation. An emergency stop button may be admittedly provided on the charging station, the actuation of which would immediately terminate the charging operation and release the charging plug lock. However, a charging station user would have to consider whether the urgency of the occurred incident would justify actuating the emergency stop button, especially since after its actuation operational disturbances, or at least a prolonged interruption of operation of the charging station, could be expected, for which the charging station user could be held liable.

The use of a card instead of a mobile terminal device may also lead to a situation in which finding the card, which is also necessary for the purpose of identifying the authorized charging station user in order to terminate or otherwise control the charging operation, is associated with considerable hardships and difficulties due to time pressure caused by the occurred incident.

It is the object of the present invention to provide a method for controlling a charging operation of a vehicle at a charging station, which provides an alternative identification means for controlling the charging operation, for which no link to a remote authorization server via a mobile phone network is required.

The object is achieved by a method having the features of claim 1.

The basic idea of the invention is to provide another identification means which can be used to control the charging operation, independent of the identification means—i.e. card and/or mobile terminal device—initially used for the approval of charging. The other identification means is realized by a control link, which is established as a near-field communication link between the mobile terminal device and a control device of the charging station and which enables the receipt of a control instruction by the control device for controlling the charging operation.

According to the invention, a control device is used which is part of or allocated to a charging station. A charging station is a general device at which a vehicle is charged with electric energy, and comprises also charging posts, wall boxes, and so on.

The following steps are carried out in accordance with the method according to the invention:

a) using, by a control device allocated to the charging station, at least a portion of a first proof of authorization used for a start of the charging operation;
b) transmitting, via a near-field communication link, at least the portion of the first proof of authorization and/or of at least a portion of a terminal-side second proof of authorization between a mobile terminal device and a control device allocated to the charging station;
c) verifying, in pairs, at least the portion of the first proof of authorization by means of at least the portion of the second proof of authorization; and
d) in case of a positive verification result, establishing a control link between the mobile terminal device (MD) and the control device via the near field communication link.

The sequence of the steps is not specified, in particular, as explained below, method step a) can also be carried out before method step b).

At least a portion of a first proof of authorization previously used to authorize the charging operation or to start the charging operation is used to establish the control link according to the invention. This first proof of authorization originally received at the control device, for example, does not necessarily have to coincide with the first proof of authorization used according to the invention, in particular, a portion of the first proof of authorization previously used for an authorization of the charging operation may be used. Alternatively, this portion of the first proof of authorization used for the method according to the invention can also include the case that an arbitrarily designed allocation or association of the first proof of authorization used for the method according to the invention to the first proof of authorization previously used for authorizing the charging operation is carried out.

For the first proof of authorization used according to the invention it is particularly irrelevant whether the first proof of authorization previously used for the authorization of the charging operation was obtained from the vehicle to be charged, from an RFID or credit card used for authorization of the charging operation, or from an authorization server.

The invention is characterized by an asynchronous—i.e. not fixed in terms of their sequence and timing—transmission of proofs of authorization which, in cooperation with a near-field communication link, leads to an establishment of a control link between the charging station and the mobile terminal device, via which charging can be stopped, halted or terminated by the mobile terminal device with the establishment of the control link. A suitable application is executed on the mobile terminal device, which is used to receive control instructions in the form of user inputs and to transmit the same via the control link to the control device of the charging station, in which the charging operation is controlled on the basis of the user inputs. An important control of the charging operation includes in particular a temporary stopping, halting or terminating of the charging operation, which releases any locking of a charging plug possibly activated during the charging operation. Via the control link, it is also possible to transmit charging status messages in opposite direction, which are transmitted from the control device to the mobile terminal device via the established control link.

In accordance with the invention, the control link is designed as a near-field communication link and is thus advantageously independent of mobile network coverage.

The first proof of authorization, among experts also known as credential, conduces to a proof of an identity of the vehicle or of the charging station user. This proof of authorization can be created temporarily and ad hoc, for example, only for the purpose of establishing the control link.

The first proof of authorization may contain one or more authenticity marks, in the current state of the art commonly represented by digital cryptographic signatures. The proof of authorization received at the start of the charging operation or the signatures contained therein can be verified by another instance, in particular by the control device or by an authorization server which is connected to the charging station via a data network or via a control line. For this purpose, the verifying instance can, among other things, completely or partially verify the cryptographic signatures by means of corresponding key material. This key material can be obtained additionally, possibly in the form of an object which in turn was authenticated by a third party which is trustworthy for the charge control.

The proof takes place, for example, in the form of a user identifier in conjunction with at least one authentication feature, which is implemented, for example, using an asymmetric key pair.

A portion of the first proof of authorization comprises a machine-readable and human-readable characterization of the vehicle, for example, wherein this portion does not necessarily include the authentication features described above.

The near-field communication link between the control device of the charging station and the mobile terminal, which is used according to the invention, conduces to a transmission of at least a portion of the first proof of authorization and/or at least a portion of a terminal-side second proof of authorization, preferably either a transmission of the first proof of authorization from the control device to the mobile terminal device or a transmission of the terminal-side proof of authorization from the mobile terminal device to the control device.

The above explanations regarding digital cryptographic signatures apply analogously to the terminal-side second proof of authorization. The first proof of authorization and the terminal-side second proof of authorization form a pair of proofs of authorization which, for example, were stored in advance due to a registration at a charging station provider for the start of charging and in the mobile terminal device, respectively.

A near field communication in the sense of this description comprises all wireless communication modes which are not based on a transmission method with a cellular mobile radio network. In particular, the term near-field communication interface or near-field communication in the sense of this description is not limited to the similarly denoted transmission method "Near Field Communication" or NFC for the contactless exchange of data via electromagnetic induction.

A control link to the charging station established after the verification of the pair of proofs of authorization allows the charging station user to control, in particular also to terminate the charging operation. Depending on the design of an application on the mobile terminal device, a termination of the charging operation also means the possibility of a temporary termination, which interrupts the charging operation with the option of resuming it.

Further embodiments of the invention are the subject of the dependent claims.

In the following, embodiments of the method according to the invention and of the control device according to the invention are described with reference to the enclosed drawing figures.

Figure 1:
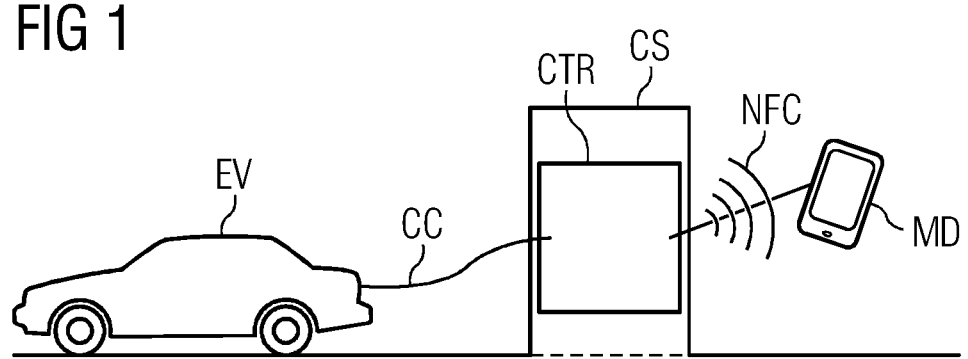
FIG. 1 shows a block diagram illustrating a charging infrastructure.

FIG. 1 shows a vehicle EV parked at a charging station CS. In the embodiment shown, energy is transmitted between charging station CS and vehicle EV via a charging cable CC. Alternatively, the vehicle EV can be charged inductively by means of several induction coils fed by the charging station. For the sake of clarity, further customary functional components within charging station CS which relate to the provision and processing of the electrical charging current are not shown. A control device CTR according to the invention is allocated to or integrated within charging station CS.

Control device CTR comprises a wireless near-field communication link NFC for connecting to a corresponding—not shown—near-field communication interface of mobile terminal device MD.

The wireless and bidirectional near-field communication link NFC between control device CTR and mobile terminal device MD is designed, for example, using common near-field communication protocols. These include, for example:
- WLAN (Wireless Local Area Network) or WiFi (Wireless Fidelity), for example according to a communication standard of the standard family IEEE 802.11;
- Bluetooth according to a communication standard IEEE 802.15.1, Bluetooth Low Energy or BLE according to an extension of the Bluetooth specifications, for example according to Bluetooth Low Energy Specification 4.2; and/or;
- transmission methods for the contactless exchange of data by electromagnetic induction using loosely coupled coils, which is also referred to as Near Field Communication.

On the near-field communication link NFC, a pair of proofs of authorization is transmitted between control device CTR and mobile terminal device MD.

Control device CTR optionally comprises means for maintaining data communication with a—not shown—authorization server. The authorization server supports user administration, identification and authorization for the charging process by charging station CS in a well-known way. In addition, this or another server can undertake other tasks such as determining and billing the electric energy withdrawn from charging station CS.

Figure 2:
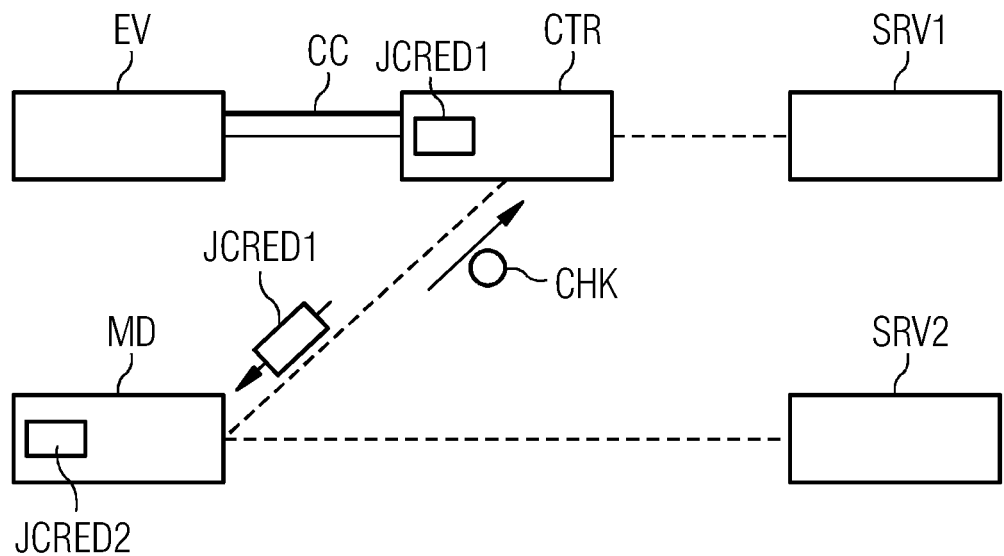
FIG. 2 shows a flow diagram illustrating an embodiment of the method according to the invention.

FIG. 2 shows a flow diagram illustrating a first embodiment of the method according to the invention. In order to establish the control link according to the invention, at least a portion of a first proof of authorization JCRED1 is used which was previously used to authorize the charging operation or to start the charging operation. This was previously transmitted from any—not shown—source to control device CTR to authorize a start of the charging operation. The source of the first proof of authorization JCRED1 used for a start of the charging operation comprises, for example, depending on the design of the underlying—but irrelevant for the invention—authorization method, for the authorization of a start of the charging operation:
- vehicle EV, from which the first proof of authorization JCRED1 used to authorize the charging operation was transmitted to control device CTR via charging cable CC or in parallel to the same;
- an authorization server, from which the first proof of authorization JCRED1 conducing to the authorization of the charging operation was transmitted to control device CTR via a—dashed drawn—data link; and/or
- a memory area of a—not shown—identification card, RFID card or credit card, from which the first proof of authorization JCRED1 conducing to the authorization of the charging operation was read via a—dashed drawn—data link by the control device CTR in a contact-bound or wireless manner.

The design of the control link according to the invention is in particular independent of a previously established communication link for the authorization of the start of charging.

To establish the control link according to the invention, at least the portion of the first proof of authorization JCRED1 and/or at least a portion of a terminal-side second proof of authorization JCRED2 is transferred between mobile terminal device MD and control device CTR via near-field communication link NFC.

According to the embodiment of the method according to the invention shown in FIG. 2, mobile terminal device MD of the charging station user, which is ready for operation, receives the first proof of authorization JCRED1 via near-field communication link NFC. After receipt of the first proof of authorization JCRED1—or a portion of the first proof of authorization JCRED1—by an application executed on mobile terminal device MD of the charging station user, a terminal-side verification of at least the portion of the first proof of authorization JCRED1 is carried out by means of the second proof of authorization JCRED2 held on the terminal side. In the simplest case, this pair-wise verification of the proofs of authorization JCRED1, JCRED2 includes a verification of an identity, a checksum or a common certificate or a key pair.

The first proof of authorization JCRED1 and the terminal-side second proof of authorization JCRED2 form a pair of proofs of authorization, wherein the second proof of authorization JCRED2 was stored in advance in the mobile terminal device due to a login at a charging station provider.

In case of a positive result of the terminal-side verification of the first proof of authorization JCRED1 by means of the second proof of authorization JCRED2 held on the terminal-side, a positive verification message CHK is then transmitted from mobile terminal device MD to control device CTR.

After receipt of the positive verification message CHK by control device CTR, a control link to the mobile terminal device MD is established which enables to control charging station CS by mobile terminal device MD.

This control link is arranged to control the charging operation by control device CTR, for example by passing a termination instruction received at mobile terminal device MD via this control link to control device CTR which stops the charging operation.

Figure 3:
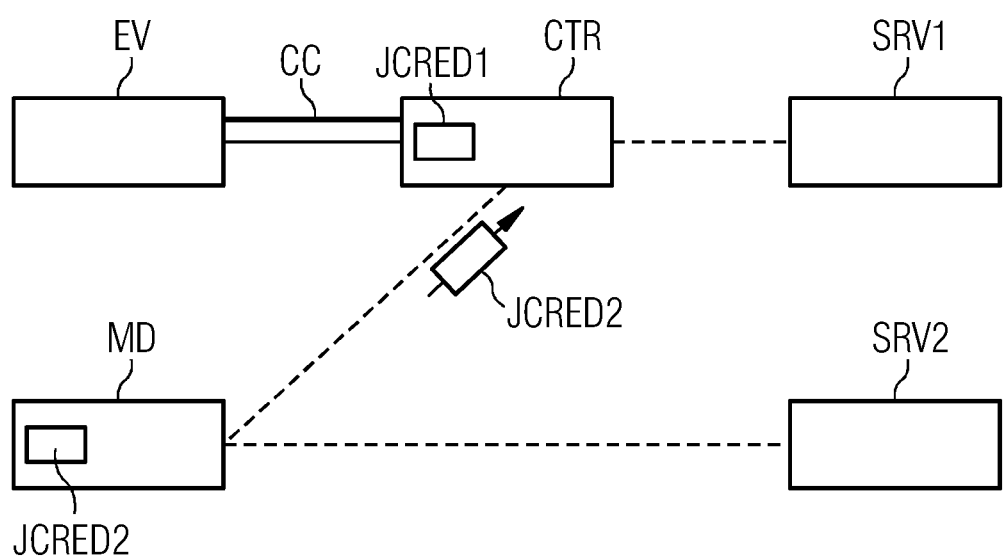
FIG. 3 shows a flow diagram illustrating another embodiment of the method according to the invention.

FIG. 3 shows an alternative embodiment in which no terminal-side verification of both proofs of authorization JCRED1 and JCRED2 is carried out in mobile terminal device MD. Instead, the terminal-side second proof of authorization JCRED2 is transmitted from mobile terminal device MD to control device CTR, where the verification of both proofs of authorization JCRED1, JCRED2 is carried out. In this embodiment, no verification message CHK is sent from mobile terminal device MD to control device CTR, but the terminal-side authorization proof JCRED2, without carrying out any verification in the mobile device. The verification then takes place in control device CTR.

In a direct vicinity of a plurality of charging stations CS, a near-field communication link to several charging stations CS is established when the terminal-side proof of authorization JCRED2 is delivered, and several potential control links to mobile terminal device MD are provided. Only after a positive verification of the second proof of authorization JCRED2 by means of the associated, i.e. "matching", first proof of authorization JCRED1, a one-to-one control link is established between charging station CS and mobile terminal device MD. All other charging stations terminate the temporarily established near-field communication links due to the failed verification of an unsuitable pair of proofs of authorization.

After establishing the control link to the mobile terminal device of the charging station user, a control, e.g. a termination, of the charging operation by mobile terminal device MD is possible.

In a further embodiment—which is not shown in the drawings—it is envisaged that a portion of the first proof of authorization JCRED1 is transmitted to mobile device MD before or after the terminal-side second proof of authorization JCRED2 is transferred to control device CTR allocated to charging station CS.

To protect against manipulation by malicious charging station users or also against malicious charging station operators, a cryptographic protection of the data communication and certificate-based verification of the proofs of authorization JCRED1; JCRED2 can be carried out in various further developments of the invention.

According to an advantageous further development of the invention, it is envisaged to cryptographically protect the near-field communication link NFC between control device CTR and mobile terminal device MD. The protection is preferably carried out with the involvement of a digital certificate for the cryptographically protected confirmation of properties, in particular of a public key certificate for the confirmation of public keys.

In one embodiment, the involvement of a provisionally verified digital certificate is envisaged. In accordance with this embodiment, a transmission of a provisionally verified digital certificate of mobile terminal device MD or of a verification information extracted therefrom by mobile terminal device MD via NFC near-field communication link to control device CTR is envisaged, based on which control device CTR, optionally in cooperation with authorization server SRV1, performs an authorization verification of mobile terminal device MD. Subsequently, a result of this verification is transferred from authorization server SRV1 to control device CTR which, depending on the received authorization verification result, approves a control of charging station CS by mobile terminal device MD, or not.

Depending on the implementation, the provisionally verified digital certificate is either part of the terminal-side proof of authorization JCRED2, or the terminal-side proof of authorization JCRED2 is part of the provisionally verified digital certificate. This also applies to the first proof of authorization JCRED1.

In one embodiment of the method according to the invention, the near-field communication link NFC is cryptographically protected by means of a protocol for encrypting data transmissions, for example by means of Transport Layer Security or TLS, Secure Sockets Layer or SSL, or Internet Protocol Security or IPsec.

In summary, the basic idea of the invention is to provide another identification means which enables controlling, monitoring, modifying, stopping or terminating the charging operation, independent of the identification means—i.e. card and/or mobile terminal device—initially used for the approval of charging. The other identification means is realized by a control link which is established as a near-field communication link between the mobile terminal device and a control device of the charging station and which enables the receipt of a termination instruction by the control device for terminating the charging operation.

The invention claimed is:

1. A method for controlling a charging operation of a vehicle at a charging station, the method comprising:
   using, by a control device allocated to the charging station, at least one portion of a first proof of authorization used for a start of the charging operation;
   transmitting, via a near-field communication link, the at least one portion of the first proof of authorization and/or at least a portion of a terminal-side second proof of authorization between a mobile terminal device and the control device allocated to the charging station;
   verifying, in pairs, the at least one portion of the first proof of authorization via the at least a portion of the terminal-side second proof of authorization; and
   in response to a positive verification result of the verifying, establishing a control link between the mobile terminal device and the control device via the near-field communication link.

2. The method of claim 1, wherein the controlling a charging operation of a vehicle via the control link comprises at least one of:
   monitoring the charging operation, modifying the charging operation, terminating the charging operation, temporarily stopping the charging operation, or a combination thereof.

3. The method of claim 1,
   wherein the at least one portion of the first proof of authorization is transmitted from the control device to the mobile terminal device via the near-field communication link; and
   wherein the verifying is performed at the mobile terminal device.

4. The method of claim 1,
   wherein the at least a portion of the terminal-side second proof of authorization is transmitted from the mobile terminal device to the control device via the near-field communication link; and
   wherein the verifying is performed at the control device.

5. The method of claim 1,
   wherein, following a control instruction received at the mobile terminal device, the control instruction is transmitted by the mobile terminal device to the control device via the established control link and the near-field communication link; and
   wherein the control device controls the charging operation of the charging station based on the control instruction.

6. The method of claim 1, wherein the control device generates at least one charging status message which is transmitted via the established control link to the mobile terminal device.

7. The method of claim 1, wherein the verifying at least one proof of authorization or of a portion thereof is performed at least partially in cooperation with at least one authorization server.

8. The method of claim 1, wherein a cryptographically protected data link is established via the near-field communication link.

9. The method of claim 1, wherein the terminal-side second proof of authorization and/or the first proof of authorization comprise a digital certificate.

10. The method of claim 1, wherein a digital certificate comprises the terminal-side second proof of authorization and/or the first proof of authorization.

11. The method of claim 1, wherein the near-field communication link is designed according to a IEEE 802.11 communication standard family.

12. The method of claim 1, wherein the near-field communication link is designed according to a IEEE 802.11 communication standard.

13. The method of claim 1, wherein the near-field communication link is designed according to a Bluetooth specification.

14. The method of claim 1, wherein the near-field communication link is designed for a contactless data exchange by electromagnetic induction via loosely coupled coils.

15. A non-transitory computer-readable medium having program code recorded thereon for controlling a charging operation of a vehicle at a charging station, the program code executed by a processor and comprising:
  program code to use, by a control device allocated to the charging station, at least one portion of a first proof of authorization used for a start of the charging operation;
  program code to transmit, via a near-field communication link, the at least one portion of the first proof of authorization and/or at least a portion of a terminal-side second proof of authorization between a mobile terminal device and the control device allocated to the charging station;
  program code to verify, in pairs, the at least one portion of the first proof of authorization by means of the at least a portion of the terminal-side second proof of authorization; and
  in response to a positive verification result, program code to establish a control link between the mobile terminal device and the control device via the near-field communication link.

16. The non-transitory computer-readable medium of claim 15, wherein the program code further comprises, in response to establishing the control link, at least one program code to monitor the charging operation, modify the charging operation, terminate the charging operation, temporarily stop the charging operation, or a combination thereof.

17. The non-transitory computer-readable medium of claim 15, wherein:
  the at least one portion of the first proof of authorization is transmitted from the control device to the mobile terminal device via the near-field communication link; and
  the pairwise verification is performed at the mobile terminal device.

18. An apparatus for controlling a charging operation of a vehicle at a charging station, the apparatus comprising:
  a memory; and
  at least one processor coupled to the memory, the at least one processor configured:
    to use, by a control device allocated to the charging station, at least one portion of a first proof of authorization used for a start of the charging operation;
    to transmit, via a near-field communication link, the at least one portion of the first proof of authorization and/or at least a portion of a terminal-side second proof of authorization between a mobile terminal device and the control device allocated to the charging station;
    to verify, in pairs, the at least one portion of the first proof of authorization by means of the at least a portion of the terminal-side second proof of authorization; and
    in response to a positive verification result, to establish a control link between the mobile terminal device and the control device via the near-field communication link.

19. The apparatus of claim 18, wherein the at least one processor is further configured, in response to establishing the control link, to perform at least one of:
  monitoring the charging operation, modifying the charging operation, terminating the charging operation, temporarily stopping the charging operation, or a combination thereof.

20. The apparatus of claim 18, wherein:
  the at least one portion of the first proof of authorization is transmitted from the control device to the mobile terminal device via the near-field communication link; and
  the pairwise verification is performed at the mobile terminal device.

* * * * *